(12) United States Patent
Roux et al.

(10) Patent No.: US 8,677,625 B2
(45) Date of Patent: Mar. 25, 2014

(54) PROCESS FOR REPAIRING A DAMAGED AREA OF AN AIRCRAFT FUSELAGE

(75) Inventors: Jacques Roux, Colomiers (FR);
Chrystele Gaudin, Toulouse (FR);
Pierre-Jean Rohic, Toulouse (FR);
Bruno Rosemberg, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 885 days.

(21) Appl. No.: 12/301,269

(22) PCT Filed: May 10, 2007

(86) PCT No.: PCT/FR2007/051248
§ 371 (c)(1),
(2), (4) Date: Nov. 18, 2008

(87) PCT Pub. No.: WO2007/135318
PCT Pub. Date: Nov. 29, 2007

(65) Prior Publication Data
US 2009/0095840 A1    Apr. 16, 2009

(30) Foreign Application Priority Data
May 19, 2006    (FR) ..................... 06 51838

(51) Int. Cl.
*B21D 47/00*    (2006.01)
(52) U.S. Cl.
USPC .................... 29/897.1; 29/402.11

(58) Field of Classification Search
USPC .............. 29/402.01, 402.09, 402.11, 402.12, 29/402.13, 402.16, 558, 889.1, 897.1; 415/189
See application file for complete search history.

(56) References Cited

U.S. PATENT DOCUMENTS

| | | | | |
|---|---|---|---|---|
| 2,692,425 A * | 10/1954 | Martin | ............. | 29/402.12 |
| 4,471,594 A * | 9/1984 | Doyle | ............. | 52/514 |
| 4,611,744 A * | 9/1986 | Fraser et al. | ............. | 228/119 |
| 4,916,880 A | 4/1990 | Westerman, Jr. | | |
| 5,023,987 A | 6/1991 | Wuepper et al. | | |
| 5,281,066 A | 1/1994 | Fitz | | |
| 6,210,108 B1 * | 4/2001 | Ebacher | ............. | 415/189 |
| 7,934,315 B2 * | 5/2011 | Milleville | ............. | 29/889.1 |
| 2005/0120555 A1 * | 6/2005 | Boudereau et al. | ............. | 29/889.1 |

OTHER PUBLICATIONS

International Search Report dated Sep. 6, 2007, from corresponding PCT application.

* cited by examiner

*Primary Examiner* — David Bryant
*Assistant Examiner* — Ryan J Walters
(74) *Attorney, Agent, or Firm* — Young & Thompson

(57) ABSTRACT

A process for cutting out a damaged area of an aircraft fuselage, in particular so as to repair the damaged area, includes in making at least one cut-out in the fuselage (20) so as to delimit a cut-out area (24) that encompasses the damaged area and that includes at least one flare-out, characterized in that it includes making a hole (34) at the flare-out of the cut-out area (24) with a tool whose diameter corresponds to that of the desired flare-out.

6 Claims, 2 Drawing Sheets

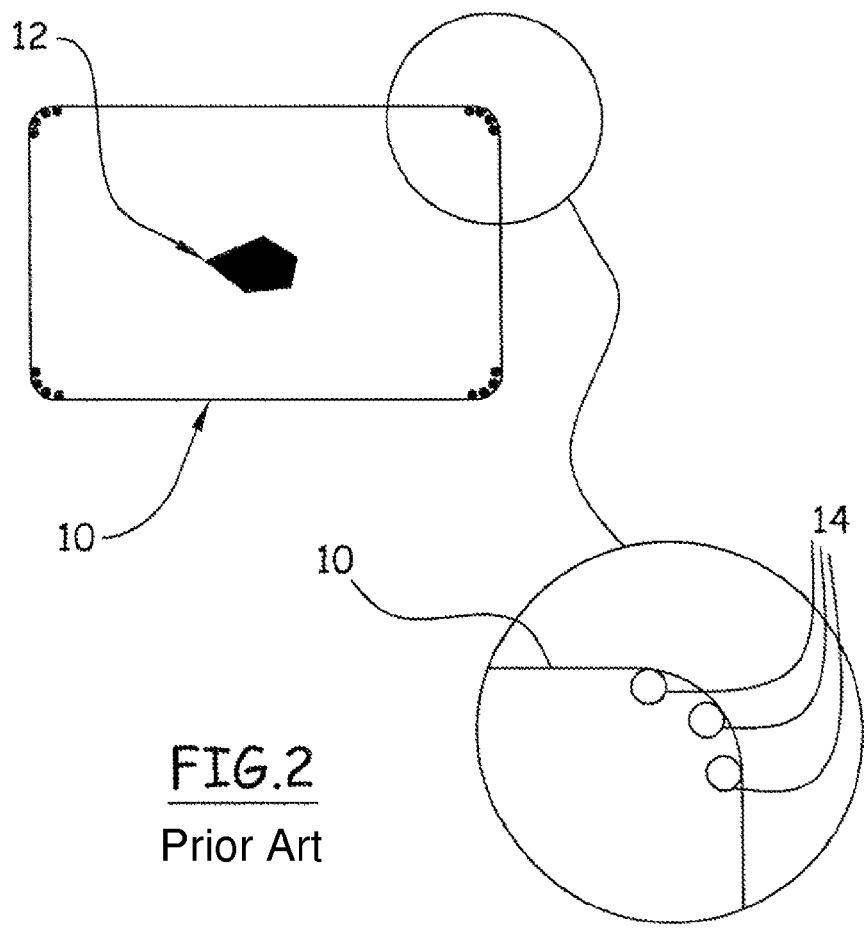
FIG.1
Prior Art
FIG.2
Prior Art
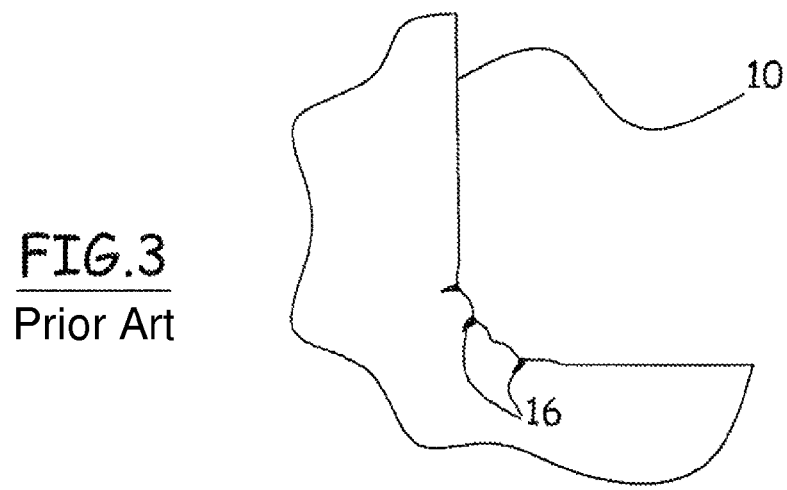
FIG.3
Prior Art

PROCESS FOR REPAIRING A DAMAGED AREA OF AN AIRCRAFT FUSELAGE

This invention relates to a process for repairing a damaged area of an aircraft fuselage.

The fuselage of an aircraft comprises an outer shell that is generally in the form of sheet metal, reinforced by inner backing bars that constitute a framework.

The outer part of the fuselage of an aircraft may be damaged by the impact of a bird or another object. If the mark of the impact is too large, this can produce disturbances and interfere with air flows around the fuselage, so that it may be necessary to change the impacted portion of the fuselage.

According to the structural repair manual (S.R.M.=structural repair manual), paragraph 51-27-00, the repair work should be carried out by cutting out the sheet metal.

As illustrated in FIG. 1, a polygonal cut-out 10 that encompasses the impact 12 is made in the sheet metal. In general, the cut-out 10 is square or rectangular.

To limit the concentration of stresses, the angles of the cut-out 10 are flared.

To produce this cut-out, and more particularly the flared angles, the operator who is responsible for the repair work uses a drill to pierce small holes 14, for example with a diameter on the order of 6 mm, arranged inside the cut-out, whose circumference is approximately tangent to the cut-out that is to be made. Next, the operator connects these small holes 14 using a file and puts the finishing touches to the flare-out with this same tool.

These freehand cutting operations should be done with much attention to detail to try to limit the cutting defects. Consequently, they are relatively long and expensive and produce substantial downtime that is detrimental to the profitability of the aircraft.

However, even if these operations are carried out with the greatest attention to detail, the use of the file produces cutting defects, for example based on deviations of the path or the specific action of the file.

The flare-outs being maximum stress areas, these cutting defects produce cracks 16, as illustrated in FIG. 3.

These repair work defects are taken into account by damage tolerance calculations, which call for more frequent inspections following this type of repair work. In most cases, the increase in the number of inspections leads to grounding of the aircraft and a reduction in its operating time.

Following this type of repair work, if a crack is detected during an inspection, a new repair is necessary. The new cut-out on the fuselage is of a size that encompasses the crack and the previous repair work. Consequently, during successive repairs, the surface area that is delimited by the cut-out increases, which is eventually reflected by a reduction in the service life of the aircraft.

Also, this repair process is not satisfactory because it takes a long time, increases the risk of new defects appearing and increases the frequency of inspections, which is reflected by a reduction in the operating time of the aircraft and in general by a reduction in its service life.

Also, this invention aims at eliminating the drawbacks of the prior art by proposing a process for cutting out an area of a fuselage that has been damaged, in particular by an impact, able to reduce the intervention time and the risks of subsequent damages, such as, for example, the appearance of new cracks, and making it possible to increase the availability of the aircraft and its service life.

For this purpose, the invention has as its object a process for cutting out a damaged area of an aircraft fuselage, in particular so as to repair said damaged area, consisting in making at least one cut-out in the fuselage so as to delimit a cut-out area that encompasses the damaged area and that comprises at least one flare-out, characterized in that it consists in making a hole at said flare-out of the cut-out area with a tool whose diameter corresponds to that of the desired flare-out.

Other characteristics and advantages will emerge from the following description of the invention, a description that is provided only by way of example, taking into account the accompanying drawings in which:

FIG. 1 is an elevation view of an area of a fuselage that was damaged by an impact, illustrating the cut-out according to the prior art, FIG. 2 is a view that illustrates in details a flare-out of the cut-out according to the prior art.

FIG. 3 is a view that illustrates the flare-out of a cut-out according to the prior art with cracks.

FIG. 4 shows at 20 an area of an aircraft fuselage damaged by an impact 22.

Figure 4:
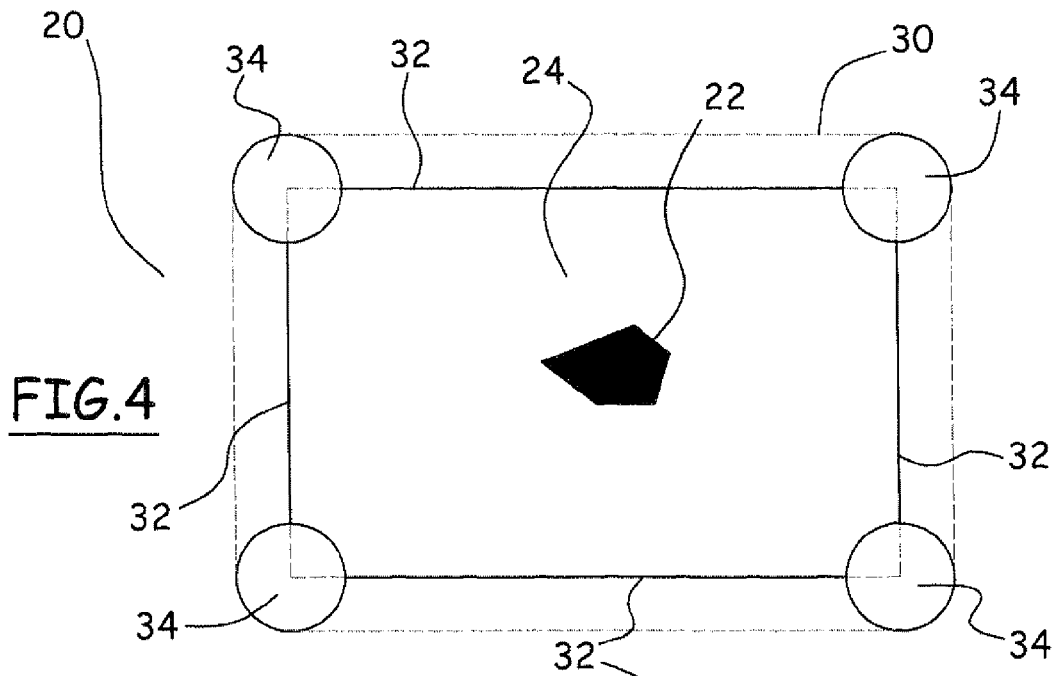
FIG. 4 is an elevation view of an area of a fuselage that was damaged by an impact that illustrates in heavy lines the cut-outs according to the invention and in broken lines the cut-out according to the prior art.
Figure 5:
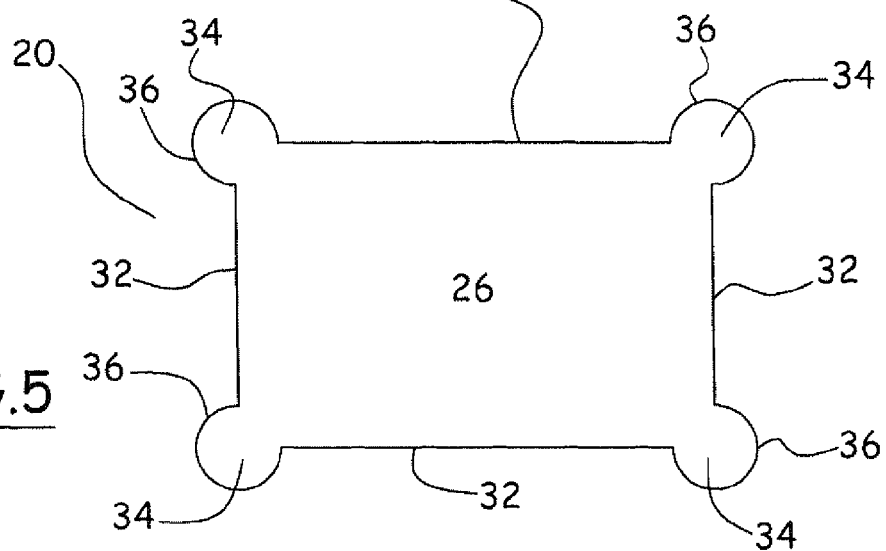
FIG. 5 is an elevation view of the fuselage area after the cut-outs according to the invention.
Figure 6:
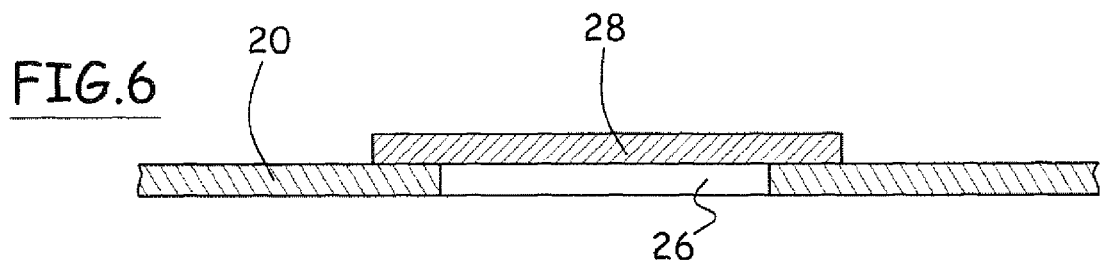
FIG. 6 is a cutaway that illustrates the repaired fuselage area.

For the remainder of the description, fuselage, in a broader sense, is defined as all parts of the outer shell of an aircraft that may be in contact with the air flows, encompassing both the body of the aircraft, and the wings and the stabilizer.

Impact is defined as any defect on the outer surface of the fuselage, in particular a denting of said surface in particular because of an impact with a bird or any other element that can produce disturbances on the level of the air flows.

The process for repairing the damaged fuselage area 20 consists in making at least one cut-out in the fuselage 20 so as to delimit a cut-out area 24 that encompasses the impact 22 and to obtain an opening 26 in the fuselage, then to block said opening with a portion of sheet metal 28 that is compatible with the remainder of the fuselage 20 whose dimensions are greater than or equal to that of the opening 26.

So as to limit the concentrations of stresses, the cut-out zone 24 comprises at least one flare-out.

The added sheet metal portion 28 is made integral by any suitable means with the remainder of the fuselage, in particular by riveting, welding, or the like.

The cut-out of the added sheet metal portion 28 as well as its attachment to the remainder of the fuselage are not presented in more detail because they are known by one skilled in the art. Preferably, for these stages, solutions that are recommended by the structural repair manual will be applied.

In FIG. 4, a cut-out 30 according to the prior art has been shown in broken lines.

The cut-out area 24 has a polygonal shape with essentially rectilinear sides 32. As a variant, the sides 32 could be slightly curved. In general, the cut-out area 24 is rectangular or square and comprises four sides 32.

According to the invention, the cut-out area 24 comprises at each angle a hole 34 that is made with a tool whose diameter corresponds to that of the desired flare-out.

The cutting process according to the invention consists in making a hole 34 at each angle of the area 24 to be cut out with a tool whose diameter corresponds to that of the desired flare-out, using in particular a drill that is equipped with a large bit or a bell, then in connecting said holes 34 by a cut-out that corresponds to the sides 32 using a saw.

Whereby the flare-out at each angle is obtained by piercing a single hole whose diameter corresponds to that of the flare-out, the surface condition of the edge of the flare-out is of better quality than that of the flare-out of the prior art manually produced by successive holes that are connected to one another.

In addition, the fact of making the holes using a rotating tool makes it possible to improve the surface condition of the edge of the openings.

Whereby the flare-out is of better quality, the risks of defects appearing, such as cracks, are reduced.

Advantageously, for safety's sake, it is possible to re-drill for several microns at holes 34 to improve the surface quality of the edge of the holes 34 so as to reduce the risks of defects appearing.

Thus, according to the invention, the implementation of the cutting process is faster, which makes it possible to reduce the intervention time and to improve the availability of the aircraft.

Reducing the risks of defects appearing makes it possible to prevent the increase in frequency of inspections and the subsequent repair work that also makes it possible to improve the availability of the aircraft and its longevity.

To ensure that the holes 34 do not encompass damage, it is possible to inspect them by non-destructive tests, for example of HFEC (high frequency eddy current) type.

The diameter of the holes 34 should be adequate to allow the insertion of a saw blade, for example on the order of 20 mm.

According to another characteristic of the invention, the sides 32 of the cut-out area 24 are not tangent to the flare-outs that are located at the angles of the polygon as for the prior art, but rather are cross-cut.

Consequently, even if there is a small deviation of the path of the saw between two holes, the latter does not challenge the quality of the flare-out, whereby the saw never reaches the area of the flare-out subjected to the maximum stresses.

Furthermore, the fact of providing sides 32 that cross-cut the holes 34 makes it possible to obtain a curved arc 36 at longer angles than that of the prior art, contributing to a better distribution of the stresses and limiting the phenomena of concentrating stresses at a point that can produce the appearance of cracks.

Advantageously, the sides 32 are arranged relative to the holes 34 so as to delimit a curved arc 36 at said holes extending approximately over 270°.

The invention claimed is:

1. A process for repairing a damaged area of an aircraft fuselage, comprising:
    making at least one cut-out in the fuselage (20) so as to delimit a cut-out area that encompasses the damaged area; and
    blocking an opening that corresponds to the cut-out area with an element (28) compatible with a remainder of the fuselage (20),
    wherein the cut-out area has a polygonal shape bounded by a closed path and having sides (32) with one hole (34) at each angle of the polygonal shape of the cut-out area, wherein a portion of each hole extends outside of the polygonal shape,
    wherein each hole (34) is cut out with a tool whose diameter corresponds to that of a desired flare-out, said holes (34) being connected by cutting along said sides (32) using a saw, and
    wherein a flare-out at each angle is obtained by piercing a corresponding hole (34) whose diameter corresponds to that of the flare-out.

2. The process according to claim 1, further comprising re-drilling for several microns at at least one hole to improve surface quality of an edge of the hole.

3. The process according to claim 2, wherein the sides of the cut-out area and each hole are cross-cut.

4. The process according to claim 1, wherein the sides of the cut-out area and each hole are cross-cut.

5. The process according to claim 4, wherein the sides are arranged relative to each hole to delimit a curved arc at each hole extending approximately over 270°.

6. A process for repairing a damaged area of an aircraft fuselage, comprising:
    designating a polygonal area to be cut out, the polygonal area encompassing the damaged area;
    forming a hole at each vertex of the polygonal area, with a tool whose diameter corresponds to that of the hole to be formed, and wherein a portion of each hole extends outside of the polygonal area;
    using a saw to cut along each side of the polygonal area, from an edge of one hole to an edge of an adjacent hole, until the polygonal area including the damaged area has been removed, thereby to form an opening that corresponds to a cut-out area in the aircraft fuselage; and
    blocking the opening with an element compatible with a remainder of the fuselage.

\* \* \* \* \*

UNITED STATES PATENT AND TRADEMARK OFFICE
CERTIFICATE OF CORRECTION

PATENT NO. : 8,677,625 B2  Page 1 of 1
APPLICATION NO. : 12/301269
DATED : March 25, 2014
INVENTOR(S) : Roux et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1010 days.

Signed and Sealed this

Twenty-ninth Day of September, 2015

Michelle K. Lee
*Director of the United States Patent and Trademark Office*